United States Patent [19]

Kuroki

[11] Patent Number: 4,883,292

[45] Date of Patent: Nov. 28, 1989

[54] CORROSION RESISTING STEEL PIPE AND METHOD OF MANUFACTURING SAME

[75] Inventor: Takanori Kuroki, Munakata, Japan

[73] Assignee: Kuroki Kogyosho Co., Ltd., Fukuoka, Japan

[21] Appl. No.: 310,003

[22] Filed: Feb. 10, 1989

Related U.S. Application Data

[63] Continuation of Ser. No. 140,929, Dec. 22, 1987, abandoned, which is a continuation of Ser. No. 689,995, Jan. 9, 1985, abandoned.

[30] Foreign Application Priority Data

Jan. 20, 1984 [JP] Japan .................................. 59-7256
Apr. 18, 1984 [JP] Japan .................................. 59-76664

[51] Int. Cl.⁴ .............................................. F16L 9/14
[52] U.S. Cl. ....................................... 285/55; 285/286; 285/422
[58] Field of Search ............................ 285/55, 286, 422; 228/153, 175, 189, 263.15, 263.14, 263.21

[56] References Cited

U.S. PATENT DOCUMENTS

| | | | |
|---|---|---|---|
| 1,990,077 | 2/1935 | Kershaw | 228/189 |
| 2,308,307 | 1/1943 | Robinson | 285/286 |
| 2,356,047 | 10/1944 | Geisinger et al. | |
| 3,148,953 | 9/1964 | Goto | 228/263.21 |
| 3,628,923 | 7/1971 | White | |
| 3,876,136 | 4/1975 | Bomberger | 285/286 |
| 4,073,427 | 2/1978 | Keifert et al. | 228/189 |
| 4,366,971 | 1/1983 | Lula | 285/286 |
| 4,556,240 | 12/1985 | Yoshida | 285/334 |

FOREIGN PATENT DOCUMENTS

| | | |
|---|---|---|
| 0063239 | 6/1982 | European Pat. Off. |
| 1320841 | 4/1963 | France |
| 824717 | 4/1959 | United Kingdom |

Primary Examiner—Dave W. Arola
Attorney, Agent, or Firm—Browdy and Neimark

[57] ABSTRACT

This invention relates to a corrosion resisting steel pipe having a kind of double construction in which an outer carbon steel pipe member is lined with respect to its whole length with a corrosion resisting material consisting of Ti, and a method of manufacturing the same, and more particularly to a doubly-constructed corrosion resisting steel pipe of a unit length consisting of an outer pipe member composed of an end tube and a general tube joined to the end tube, a short tube of a Ti metal attached to an end portion of the end tube metallurgically by the diffusion welding, and an inner pipe member of a Ti metal attached to the whole of the inner surface of the outer pipe member including the inner surface of the short tube of a Ti metal joined to the end tube, the inner pipe member of a Ti metal being seal-welded with an Ti metal at the end portion of the end tube, a pipe of a predetermined length obtained by connecting the steel pipes of a unit length being sealed at its joint portion with a Ti metal so that the Ti metal overlaps the outer pipe members, the steel pipe according to the invention thus having reliably high sealability and corrosion resistance; and a method of manufacturing such a corrosion resisting steel pipe.

4 Claims, 4 Drawing Sheets

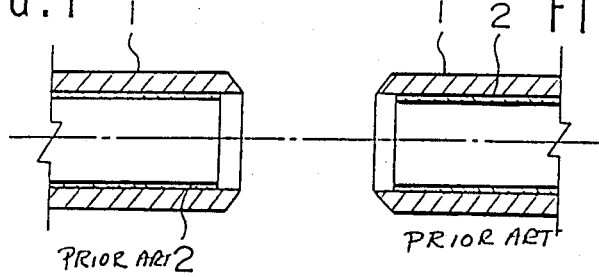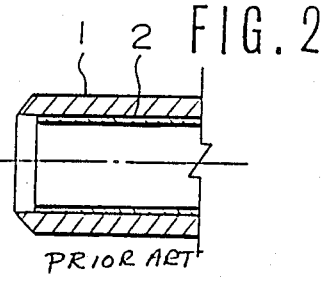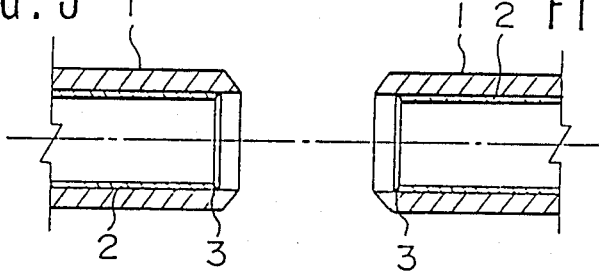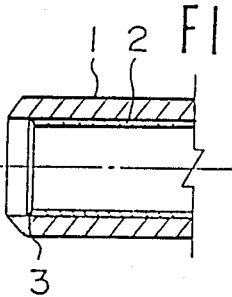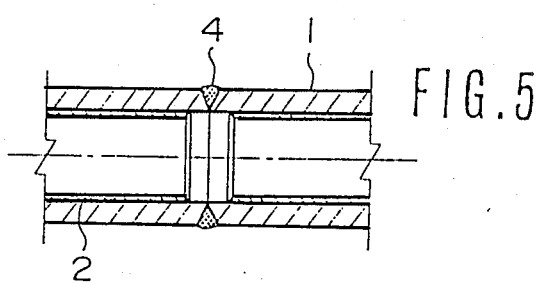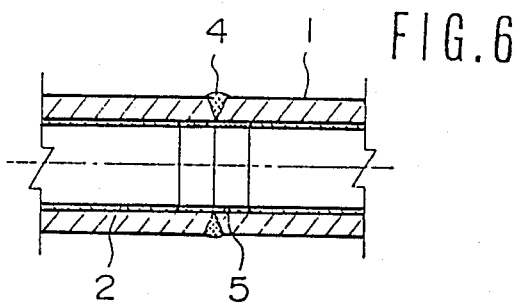

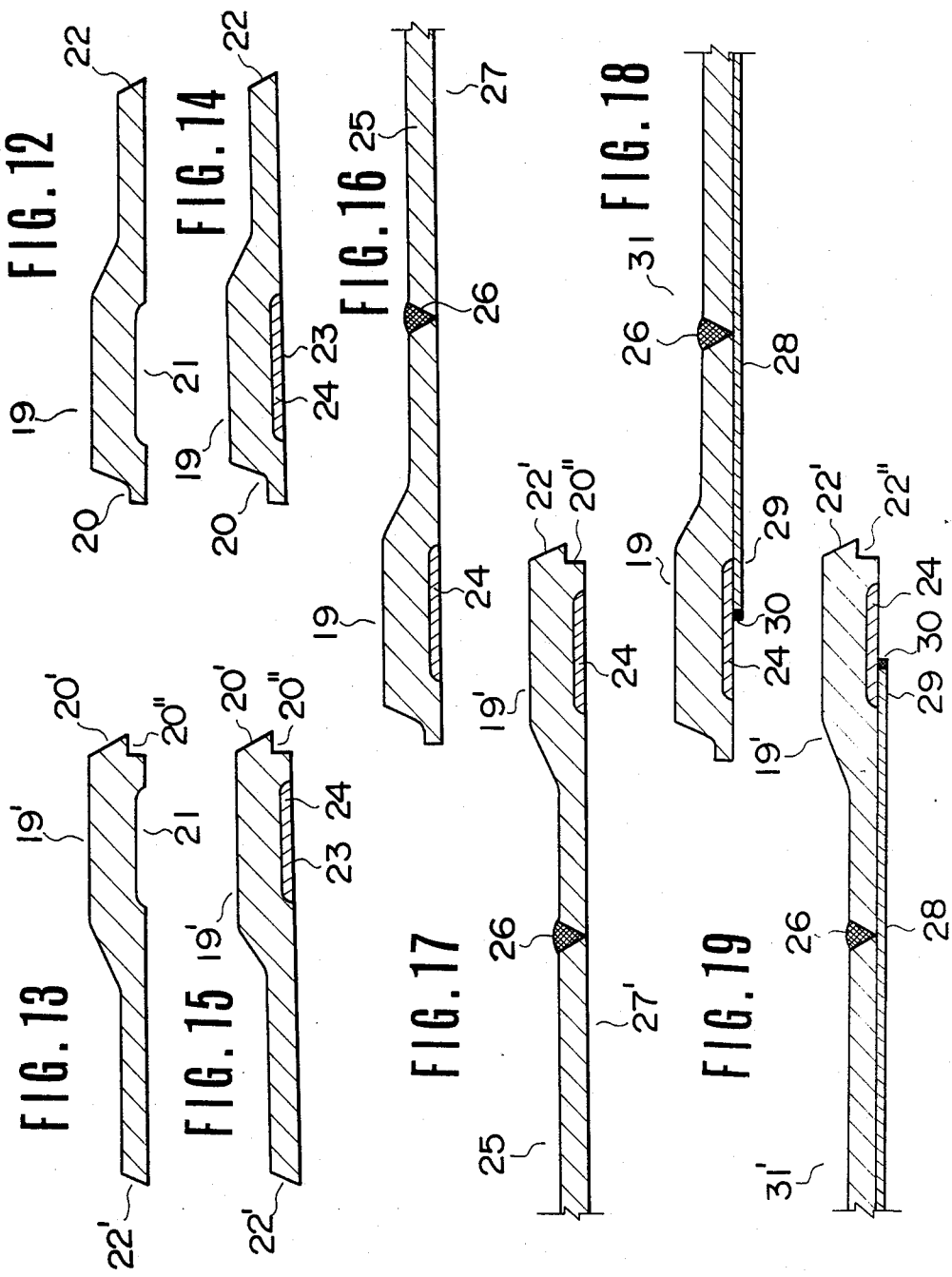

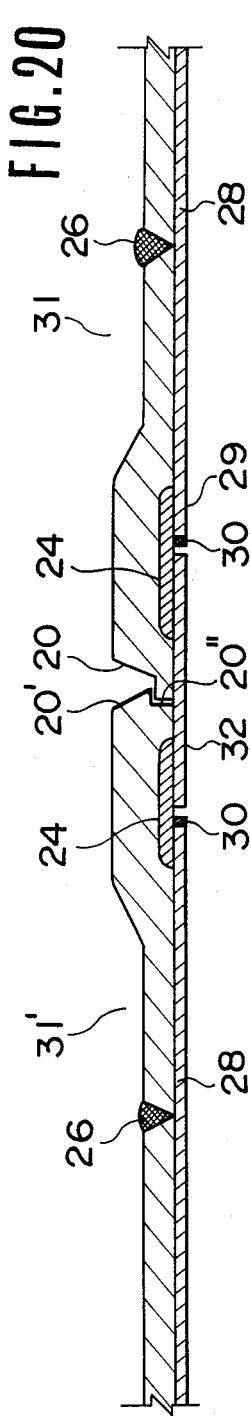
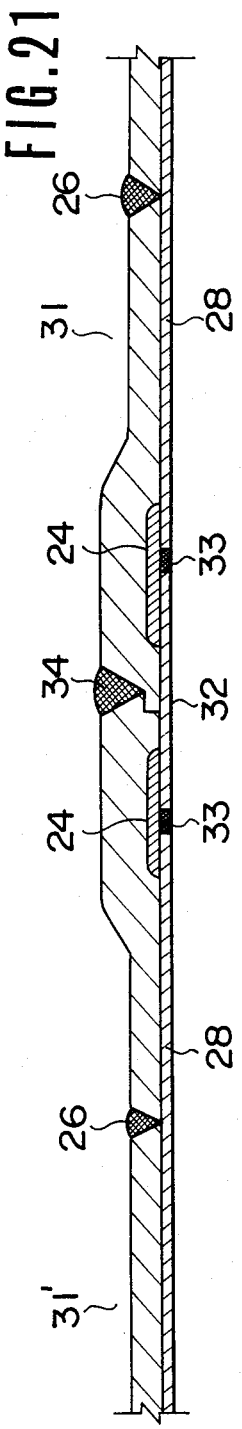
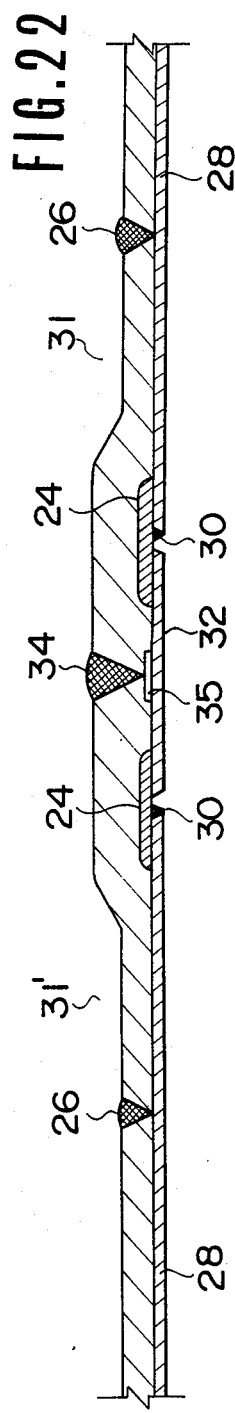
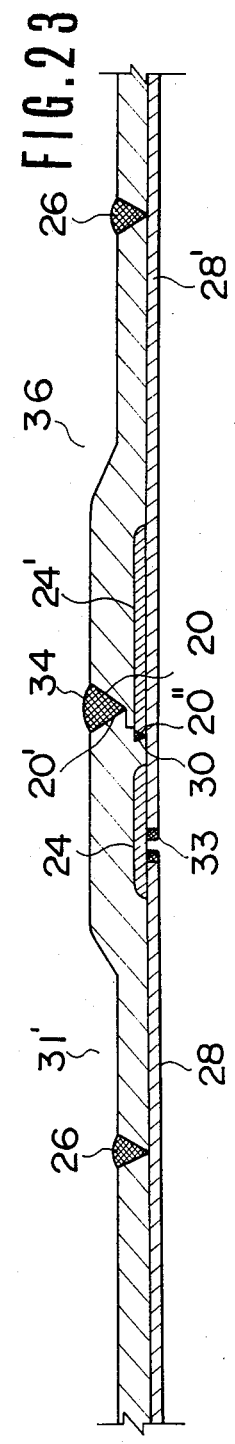

CORROSION RESISTING STEEL PIPE AND METHOD OF MANUFACTURING SAME

This application is a continuation, application Ser. No. 140,929, filed Dec. 22, 1987, now abandoned.

BACKGROUND OF THE INVENTION

1. Field of the Invention:

This invention relates to the construction of a pipe for plants and the techniques for manufacturing the pipe.

2. Description of the Prior Art:

As generally known, an oil well pipe and a pipe used for the piping in a chemical plant and a nuclear power plant require to have not only the pressure resistance and thermal resistance but also the corrosion resistance.

A high alloy pipe, such as a stainless steel pipe or a nickel (Ni) based alloy pipe has been used as a corrosion resisting steel pipe which meets these conditions. However, such alloys are expensive. With a view a reducing the material cost, a means for providing a double pipe has been proposed, which consists of an outer heat resisting and pressure resisting carbon steel pipe member, and an inner pipe member composed of a corrosion resisting metal, such as stainless steel and attached to the inner surface of the outer pipe member metallurgically or mechanically to furnish the outer pipe member with the corrosion resistance.

For example, as shown in FIGS. 1 and 2, the inner austenite steel pipes 2, are inserted in the outer carbon steel pipes 1, to be expanded by a liquid pressure and thereby fit the inner pipes 2, closely in the outer pipes 1. The ends of the inner pipes 2, are then welded 3, to the inner surfaces of the outer pipes 1, to seal the same as shown in FIGS. 3 and 4.

The ends of these unit end pipes are joined together by butt welding 4 the outer pipes 1, as shown in FIG. 5, and then build-up welding 5 the ends of the inner pipes 2, with a filler metal, which consists of austenite stainless steel, as shown in FIG. 6.

It is known well that, in order to join an inner corrosion resisting pipe to an outer pipe in the above-mentioned manner for the purpose of obtaining a corrosion resisting steel pipe having a high strength, it is better to use a mechanical lining method than to use a metallurgical method, i.e., a clad-forming method.

It is technically difficult, in general, to join an inner pipe to an outer pipe by using, for example, titanium (Ti) having a high corrosion resistance, or a titanium (Ti) metal, such as a titanium (Ti) alloy (these metals will hereinafter be referred to as generally "Ti metals").

It has recently become technically possible to metallurgically combine a Ti metal with carbon steel by a means such as explosive cladding or diffusion bonding.

In general, as the lengths of pipes increase, the number of joint portions thereof decrease, and the stability thereof with respect to the strength increases. Moreover, the pipes of larger lengths enable a piping operation to be simplified. Since the lengths of pipes are limited by a pipe-manufacturing apparatus used in a factory and a transportation means used to carry pipes from a factory to a place of piping, the unit lengths of pipes are standarized.

There is, of course, a means, which is used in a special case, for combining pipes together and then plastically processing the resultant pipes. However, there is a difference is general between the processability of a carbon steel pipe and that of a corrosion resisting Ti metal, so that it is said to be difficult to plastically process a corrosion resisting steel pipe of a large length.

While the corrosion resisting steel pipes of a set unit length manufactured in a factory are transported to a building site so as to be arranged therein, they are stored in the open air temporarily in some cases. In such cases, there is the possibility that the corrosion progresses with the lapse of time on the inner side of the joint surfaces of the end portions of the outer pipe and the inner corrosion resisting pipe joined to the inner surface of the outer pipe. Therefore, it is necessary in general that the pipe ends be seal-welded.

However, even when the carbon steel constituting the outer pipe and the corrosion resisting Ti metal constituting the inner pipe on the inner surface of the outer pipe are combined together by using an intermediate material, the attainment of a sufficiently high bond strength of the joint portion of the pipes cannot be expected.

Although the corrosion resistance of the corrosion-resisting Ti metal applied to the inner surface of an outer steel pipe in the above-mentioned manner is high, it is metallurgically inconvenient to seal-weld this metal at an end of the steel pipe.

Also, when steel pipes made to a unit length are joined together, it is difficult to seal them completely in a non-corrosion-progressing state due to the above-mentioned inconveniences.

SUMMARY OF THE INVENTION

A first object of the present invention is to solve the problems involved in a corrosion resisting steel pipe lined with a corrosion resisting material and made on the basis of the conventional techniques described above. A second object of the present invention is to effectively utilize a Ti metal, which has a high corrosion resistance, for the production of an inner pipe to be attached to the inner surface of an outer steel pipe. A third object of the present invention is to provide a corrosion resisting steel pipe capable of being seal-welded at an end portion thereof with a high reliability with the welded protion having a sufficiently high strength, and make it possible to seal-weld the joint portions of steel pipes of a unit length in the same manner. A fourth object of the present invention is to provide an excellent corrosion resisting pipe capable of retaining its corrosion resisting functions with respect to its whole length while in use, and being utilized profitably in various kinds of industrial fields.

BRIEF DESCRIPTION OF THE DRAWINGS

FIG. 1 is a sectional view of an end portion of a pipe made on the basis of the conventional techniques;

FIG. 2 is a sectional view of an end portion of another pipe made on the basis of the conventional techniques, which is to be joined to the pipe shown in FIG. 1;

FIG. 3 is a sectional view of a seal-welded portion of the inner pipe member at the end portion of the pipe shown in FIG. 1;

FIG. 4 is a sectional view of a seal-welded portion of the inner pipe member at the end portion of the pipe shown in FIG. 3;

FIG. 5 is a sectional view of the butt-welded end portions of the outer pipe members of these two pipes;

FIG. 6 is a sectional view of a joint for the same pipes;

FIG. 12 is a sectional view of an end tube;

FIG. 13 is a sectional view of another end tube to be joined to the short pipe shown in FIG. 12;

FIG. 14 is a sectional view of the first end tube which is lined with Ti;

FIG. 15 is a sectional view of the second end tube which is lined with Ti;

FIG. 16 is a sectional view of an outer pipe member;

FIG. 17 is a sectional view of another outer pipe member to be joined to the outer pipe member shown in FIG. 15;

FIG. 18 is a sectional view of a unit steel pipe;

FIG. 19 is a sectional view of another unit steel pipe to joined to the unit steel pipe shown in FIG. 18;

FIG. 20 is a sectional view of steel pipes in each of which the outer and inner pipe members are joined together;

FIG. 21 is a sectional view of the steel pipes connected together;

FIG. 22 is a sectional view illustrating the manufacturing of another embodiment of a corrosion resisting steel pipe; and FIG. 23 is a sectional view illustrating the manufacturing of still another corrosion resisting steel pipe.

DESCRIPTION OF THE PREFERRED EMBODIMENTS

The embodiments of the present invention will now be described as follows with reference to FIG. 7 and downward.

Figure 7:
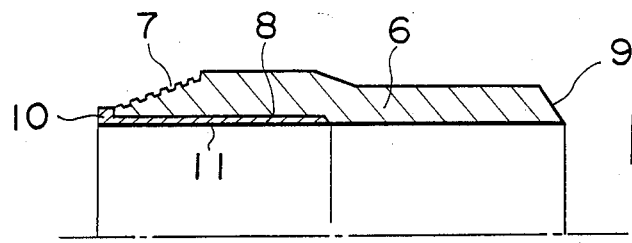
FIGS. 7–9 illustrate a process for manufacturing the pipe of an embodiment of the present invention.
Figure 8:
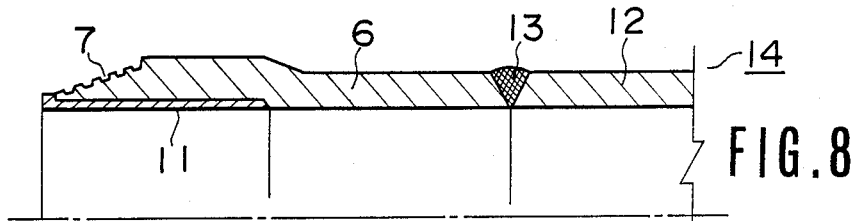
Figure 9:
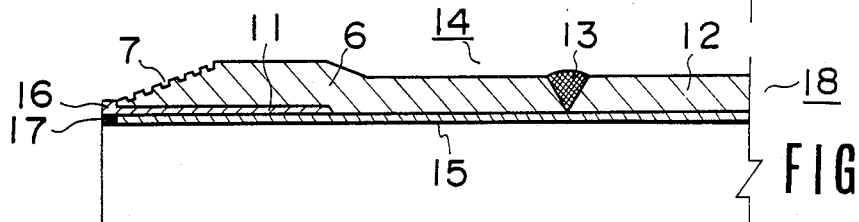

FIGS. 7-9 show a mode of embodiment of a coupling joint-connected pin type corrosion resisting steel pipe used as an oil well pipe. An end tube 6 separated from a general pipe member which constitutes an outer carbon steel pipe member consists of carbon steel. A male thread 7 in a pin section, which is to be engaged with a coupling (not shown), is formed on a front end portion of the end tube 6. A lining joint portion 8 is formed on the front end and the inner surface of the end tube 6 by a predetermined mechanical process, and a beveled portion 9 at the rear end thereof.

A short, cylindrical Ti pipe 11 having a flange 10 at its front end is combined unitarily with the end tube 6, which is formed in the above-mentioned manner, for the outer pipe member by diffusion welding so that the inner surface of the short tube 11 becomes smooth and flush with that of the end tube 6.

In this case, a generally-used diffusion welding means, for example, a method, such as hot isostatic pressing can be used since the end tube 6 is short. The male thread 7 and the beveled portion 9 at the rear end of the end tube 6 may be mechanically processed after they have been diffusion-welded.

After the end tube 6 is thus formed, a general tube 12 of carbon steel as a divisional body of an outer pipe member is butt welded 13 to the end tube 6 via the beveled portion of the tube 12 to combine these tubes 6, 12 unitarily and thereby form an outer pipe member 14 as shown in FIG. 8.

After the outer pipe member 14 is thus formed, an inner Ti pipe member 15 is fitted closely in the outer pipe member 14 over the whole length thereof as shown in FIG. 9, and the outer and inner pipe members 14, 15 are then combined firmly via a sufficient fitting margin by subjecting the inner pipe member 15 to a known pipe-expanding step using a liquid pressure.

As a result, the front end of the inner pipe member 15 and that of the short Ti tube 11 fitted in the end tube 6 in the outer pipe member 14 are aligned with each other. The inner pipe member 15 and the short tube 11 are sealed at their end portions 16 by seal-welding the same in a suitable manner.

The seal-welding of the short Ti tube 11 may be done without trouble at an intermediate portion thereof.

In this case, the front end of the end tube 6 can be seal-welded easily since both of the short tube 11 and the inner pipe member 15 consist of Ti metal, so that the strength of the seal-welded portion can be secured sufficiently. The short Ti tube 11 is joined to the end tube 6 at the end portion 16 reliably in advance by a metallurgical method, i.e. the diffusion welding. If the short Ti tube 11 is made sufficiently long so as to be seal-welded at its intermediate portion to the front end of the inner pipe member 15, the separation of the short seal-welded tube 11 from the end tube 6 can be prevented. Even if the short tube 11 should be separated partially at the portion thereof, which is very close to the seal-welded portion thereof, form the end tube 6, the overall sealing performance of the seal-welded portion is not adversely affected.

Accordingly, even when such a corrosion resisting pipe 18 is stored in the open air after it is manufactured and before it is transported to a building site, there is no possibility that corrosion progresses from the pipe end 16 toward the boundary portion between the inner and outer pipe members 15, 14. The pin type threaded structure referred to previously may be replaced by a flange so as to join the end tube 6 to a coupling thereby.

Figure 10:
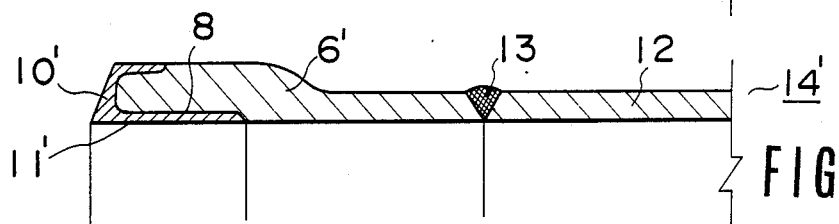
FIGS. 10 and 11 illustrate a process for manufacturing a corrosion resisting steel pipe of another embodiment.
Figure 11:
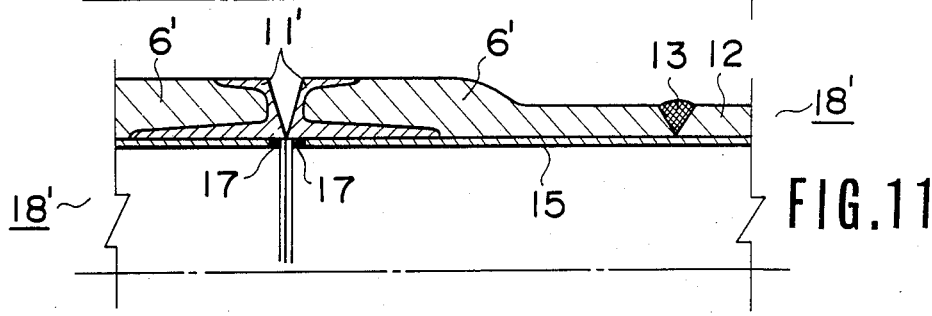

The embodiment shown in FIGS. 10 and 11 is in a mode of using the same as a pipe for plants or transportation. This embodiment is made by dividing an outer tube of carbon steel into two in the same manner as in the previously-described embodiment, engaging a short Ti tube 11', which has a back flange 10' with a mechanically-processed surface 8 of an end tube 6' and subjecting the resultant product to a predetermined diffusion welding method to thereby unitarily fix the short tube 11' to the end tube 6' in the same manner as in the previously-described embodiment, and then connecting a general tube 12 to the end tube 6' unitarily via a beveled portions thereof by the butt welding 13 to form an outer pipe member 14'. After the outer pipe member 14' is formed, an inner pipe member 15 consisting of a Ti metal is fitted relatively therein to be expanded by a liquid pressure over the whole length of the outer pipe member 14' via a sufficient fitting margin to thereby combine the pipe members 14', 15 together firmly as shown in FIG. 11. The portion of the short tube 11' combined with the end tube 6' which constitutes a part of the joint end portion of the corrosion-resisting steel pipe 18' of a predetermined length thus formed, and the portion of the inner pipe member 15 which corresponds to the mentioned portion of the short tube 11' are seal-welded 17. The butt-welding of corrosion-resisting steel pipes thus obtained is done with deposited Ti.

What is shown in FIGS. 12-23 is a mode of still another embodiment of a welded joint-connected corrosion resisting pipe used for chemical plants. The end tubes 19, 19' separated from the general tubes, which constitute the outer pipe members, and shown in FIGS. 12 and 13 consist of carbon steel. The end tubes 19, 19' have at their front ends beveled portions 20, 20' to be butt-welded, one 20' of which has a grooved fitting portion 20" formed by a mechanical process.

Both of the end tubes 19, 19' are provided in the inner surfaces thereof with liner attaching portions 21, 21 made by a predetermined mechanical process. The end tubes are also provided at their rear ends with beveled portions 22, 22' to be butt-welded.

Short, cylindrical tubes 24 made of Ti and having inner surfaces 23 to be set flush with those of the end tubes 19, 19' are fixed unitarily by diffusion-welding as shown in FIGS. 14 and 15 to the liner-attaching portions 21, 21 of the inner surfaces of the end tubes 19, 19 in the outer pipe members formed in the above-mentioned manner.

Since these end tubes 19, 19' are short, the diffusion welding can be done in this case by a generally-used diffusion welding means.

After the end tubes 19, 19' are thus formed, the general carbon steel tubes 25, 25 as the divisional parts of the outer pipe member are butt-welded 26, 26 to the end tubes 19, 19' via the beveled end portions thereof to combine them unitarily, so that the outer pipe members 27, 27' are formed.

After the outer pipe members 27, 27' are thus formed, the inner pipe members 28, 28 of a Ti metal are inserted thereinto until the latter reach the intermediate portions of the short tubes 24, 24 of a Ti metal in the outer pipe members 27, 27', to thereby laminate the inner pipe members 28, 28 relatively on the outer pipe members 27, 27' as shown in FIGS. 18 and 19. The outer and inner pipe members 27, 27', 28, 28' are then combined together firmly via a sufficient fitting margin by a known liquid-pressure pipe expanding method.

As a result, the inner pipe members 28, 28 and the short tubes 24, 24 of a Ti metal fixed to the front end portions of the end tubes 19, 19' in the outer pipe members 27, 27', overlap each other at the front end portion thereof. The inner pipe members 28, 28 and short tubes 24, 24 are then seal-welded suitably at the overlapping portions 29, 29 to complete the pipe end sealing.

Since the short tubes 24, 24 and inner pipe members 28, 28 overlapping each other at the end portions of the end tubes 19, 19' consist of a Ti metal, the seal-welding 30, 30 mentioned above can be done easily, and the strength of the welded portions can be certainly secured. At the overlapping portions 29, 29 of the end tubes 19, 19', the short tubes 24, 24 of a Ti metal are combined with the end tubes 19, 19' in advance metallurgically and reliably by the diffusion welding.

Accordingly, even if the corrosion resisting steel pipes 31, 31' of a unit length thus obtained and shown in FIGS. 18 and 19 are stored in the open air after they are manufactured and before they are carried to a building site, there is no possibility that corrosion progresses from the ends of the pipes to the boundary portions between the inner and outer pipe members 28, 28, 27, 27'.

In order to transport the above-mentioned corrosion resisting steel pipes 31, 31' to a building site and install the same therein, the beveled portions 20, 20' at the end portions of the corrosion resisting steel pipes 31, 31 of a unit length are butted on each other via the fitting portions, i.e. a projection and an undercut type grooved portion 20" and a short tube 32 of a Ti metal having the same thickness and diameter as the inner pipe members 28, 28, inserted between the inner pipe members 28, 28 and overlapping the outer pipe members 31, 31', as shown in FIG. 20. The inner pipe members 28, 28 and the short tube 32, all of which consist of a Ti metal, are then butt-welded 33, 33, and the beveled portions 20, 20' are also butt-welded 34, to thereby complete the combining of these steel pipes 31, 31' of a unit length.

In this case, the butt-welding 33, 33 of the short tube 32 of a Ti metal and the inner pipe members 28, 28 may be done after that 34 of the beveled portions 20, 20']of the steel pipes 31, 31' of a unit length.

The butt-welding 34 may be substituted by the piercing welding, and the shape of the beveled portions may be determined in a suitable manner.

If the diameter of the steel pipes 31, 31' is large, the combining of the short tube 32 can be done after after the piercing type butt-welding 34 is completed. The combining of the short tube 32 can also be done before butt-welding 34 is carried out. In this case, only the portions of the steel pipes 31, 31' which are close to the portions thereof to be welded 34 are narrowed to a small diameter, and, after the welding 34 is done, the short tube 32 is processed plastically and attached sealingly to the inner portions of the pipes 31, 31'.

The butt-welding of the inner pipe members 28, 28 and the short tube 32 may be done suitably by inserting a welding jig into the open end of a shorter steel pipe 31 (31').

The inner surfaces of the corrosion resisting steel pipes 31, 31' . . . of a unit length connected successively are rendered flush with one another by the alternately connected inner pipe members 28, 28 . . . of a Ti metal and the short tubes 32, 32 . . . , and also the short tube 24 and the welded portion 33, and the short tube 32 and the butt-welded portion 34 in each joint portion overlap each other to enable the corrosion-sealing of the steel pipes to be done reliably.

FIG. 22 shows a mode of embodiment used also for plants or as a transport pipe. In this embodiment, symmetrical undercuts are formed at the beveled portions of two divisional end tubes 19, 19', which are similar to the end tubes 19, 19' in the presiding embodiment, of an outer pipe member of carbon steel. The end tubes 19, 19' are then put together with a short steel tube 35 fitted in the undercuts and joined to the upper surface of the short tube 32 mechanically or metallurgically. The resultant end tubes 19, 19' are combined unitarily via the beveled portions 20, 20' by the butt-welding 34.

In the embodiment shown in FIG. 23, a short tube 24' of a Ti metal is diffusion welded to one corrosion resisting steel pipe 36 with the former projecting beyond a beveled portion 20 of the latter. The resultant steel pipe 36 is engaged with another steel pipe 31' of a unit length with this short tube 24' fitted in an undercut groove 20" at a beveled portion 20' of the pipe 31'. An inner pipe member 28' is formed to such a length that enables the pipe member 28' to overlap a short tube 24 of a Ti metal in the second steel pipe 31' of a unit length. The level of the corrosion-preventing effect of this embodiment, which is obtained while it is stored in the open air is as high as that in each of the above-described embodiments.

The mode of embodiment of the present invention is not, of course, limited to those of the above-described embodiments. For example, the present invention can be used not only as an oil well pipe and a pipe for a chemical plant but also as a pipe for a nuclear reactor. The present invention can be used in various other modes by freely selecting the wall thickness and diameter of the end tube in the corrosion resisting steel pipe.

The material of the inner pipe member welded to the inner surface of the outer pipe member is not limited to Ti; it may, of course, be a Ti alloy.

The tube of a Ti metal fitted on the inner surface of the outer pipe member can be combined therewith not only by the diffusion welding referred to above but also by the pressure welding.

According to the present invention described above, the corrosion resisting material and inner pipe member welded to the inner surface of the outer pipe member in the corrosion resisting steel pipe consist basically of a Ti metal, such as Ti and a Ti alloy. Therefore, the corrosion-resisting performance of each part of the pipe is very good, and the pipe can serve as an excellent corrosion resisting steel pipe.

Since the end portion of the inner pipe member of a Ti metal mechanically joined to the whole of the inner surface of the end tube of a Ti metal is Ti-sealed at the end portion of the steel pipe of a unit length, the corrosion does not progress from the pipe end to the boundary portion between the outer and inner pipe members even when the steel pipe is stored in the open air due to the transportation conditions after the pipe is manufactured in a factory and before it is carried to a building site.

Since a short tube of Ti metal is attached metallically to the inner surface of the end portion of the end tub in the outer pipe member by diffusion-welding, the outer pipe member can be Ti-sealed easily to the inner pipe member and the short tube by the diffusion welding. Accordingly, the pipe end portion can be sealed reliably.

In the method of manufacturing the corrosion resisting pipe, and end tube in the outer pipe member and the general tube are divided, and a tube of a Ti metal is combined with the end portion of the end tube metallurgically in advance. Therefore, in order to diffusion weld a tube of a Ti metal to the end tube in the outer pipe member, the former can be set easily in an apparatus owing to the small length thereof. Thus, the tube of a Ti metal can be welded to the end tube irrespective of the length of the corrosion resisting steel pipe as a final porduct.

Since the general tube is welded to the end tube to which the tube of a Ti metal is joined, the outer pipe member as a whole can be formed easily.

The inner pipe member of a Ti metal is fitted relatively in the outer pipe member, which is thus formed, with respect to the whole length thereof to weld the former to the whole of the inner surface of the latter. Therefore, even if the end portion of the tube of Ti, which is attached metallically to the end tube, is not welded reliably to the outer pipe member, the inner pipe member is finally seal-welded as its end portion to the end portion of the tube of a Ti metal welded to the end tube, at the end portion of the inner surface of the outer pipe member. Consequently, the inner pipe member can be seal-welded to the inner surface of the outer pipe member reliably.

In the corrosion resisting steel pipes of a unit length welded to each other in this manner, the outer pipe member and the tube of a Ti metal overlap each other at the joint portions thereof, so that the sealability and corrosion resistance of the pipes can be improved to high levels reliably.

Since the Ti-seal-welding of the tubes of a Ti metal is done in the present invention, the welding of the tubes and pipe member can be done easily, and a higher reliability of the pipe with respect to its corrosion resistance can be ensured.

What is claimed is:

1. A corrosion resisting steel pipe comprising an outer steel pipe member lined with an inner liner of a corrosion resisting material, characterized in that said steel pipe has a unit length and consists of an outer steel pipe member and an inner pipe member made of titanium metal;

said outer steel pipe member consisting of an end tube and a general tube joined to said end tube;

said inner pipe member comprising a short tube of titanium metal pipe member metallurgically bonded inside of an end portion of said end tube and a long tube of titanium metal pipe member metallurgically joined by heat welding to an end portion of an inside portion of said short tube;

wherein said short tube of titanium metal is fitter closely outside of a portion of said long tube of said titanium metal pipe member.

2. The corrosion-resisting steel pipe of claim 1 wherein an end of said long tube of titanium metal pipe member is titanium-seal-welded at the inside surface portion of said short tube of titanium metal.

3. The corrosion resisting steel pipe of claim 1 wherein said end tube projects beyond the end of said titanium metal pipe member.

4. The corrosion resisting steel pipe of claim 1 wherein another short inner titanium metal pipe member is welded to said inner titanium metal pipe member, and said another short tube of titanium metal is fitted inside the surface of said end tube of the outer pipe member and projecting beyond the end of said end tube.

* * * * *